UNITED STATES PATENT OFFICE.

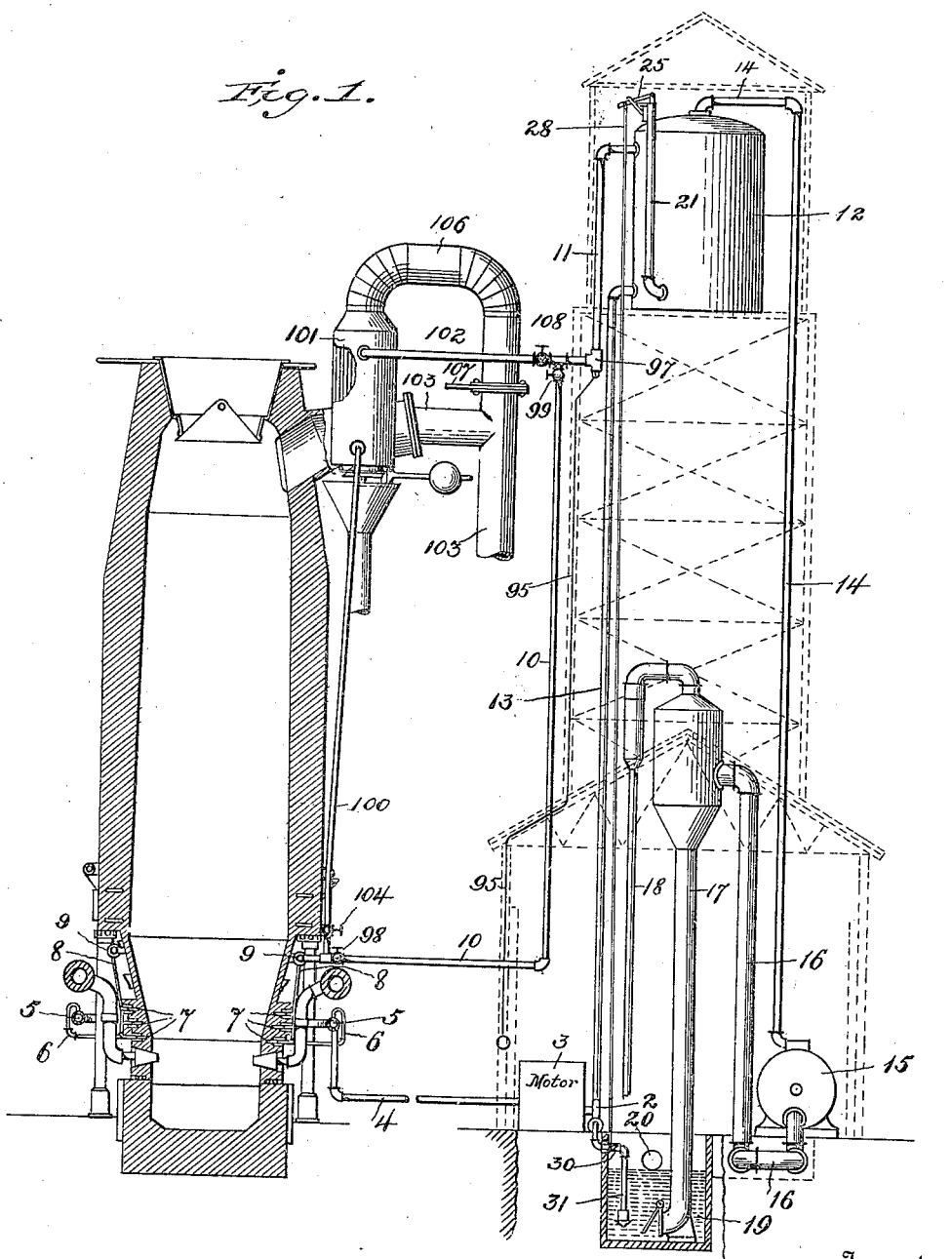

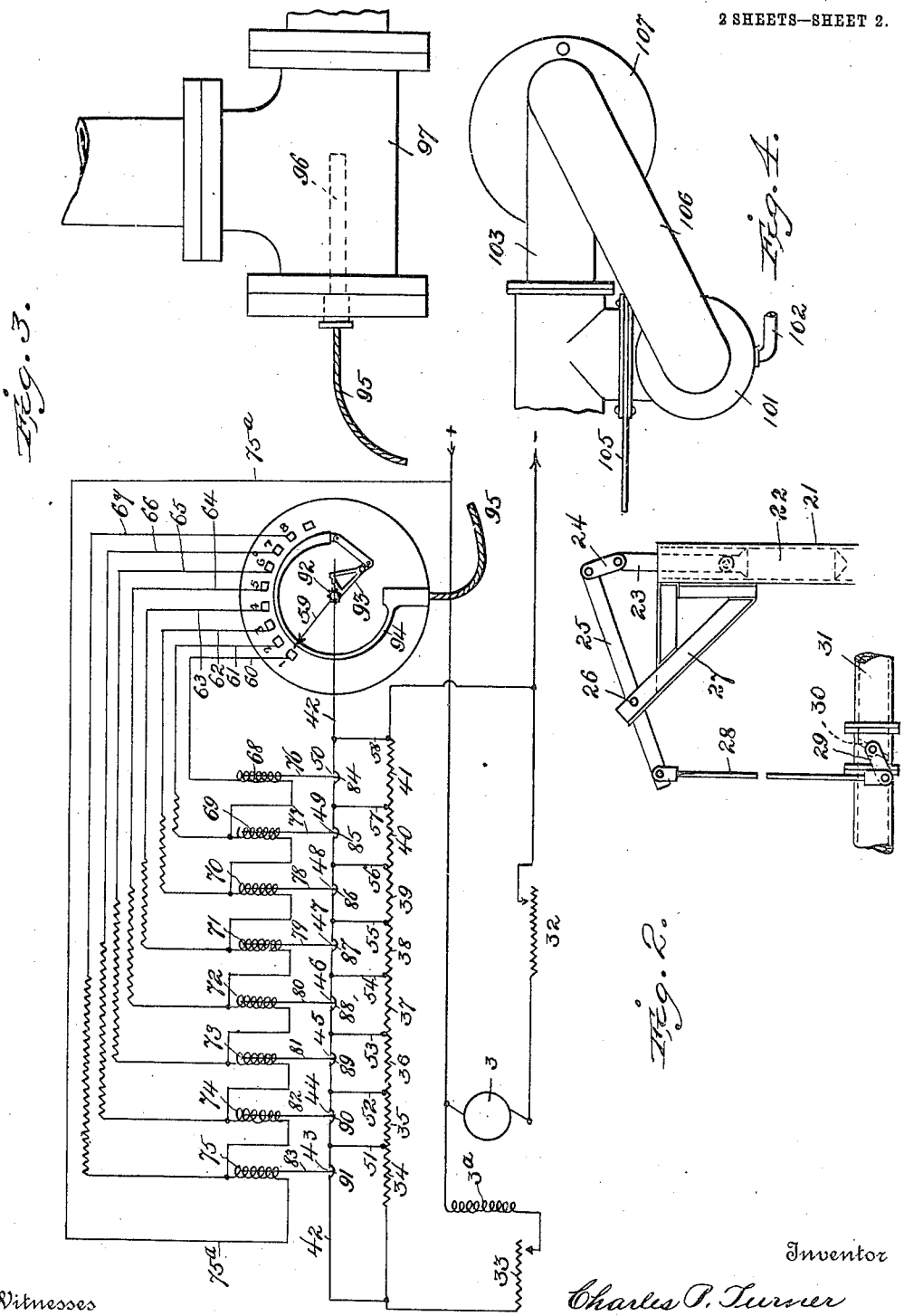

CHARLES P. TURNER, OF HARRISBURG, PENNSYLVANIA.

VAPOR POWER PLANT.

952,386.  Specification of Letters Patent.  Patented Mar. 15, 1910.

Application filed September 13, 1909. Serial No. 517,519.

*To all whom it may concern:*

Be it known that I, CHARLES P. TURNER, a citizen of the United States, residing at Harrisburg, in the county of Dauphin and State of Pennsylvania, United States of America, have invented certain new and useful Improvements in Vapor Power Plants; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to power plants for utilizing the vapor of hot liquid, specifically water, that has received its heat during its employment as a cooling medium, and to this end I conduct the water that has passed through the cooling devices to a storage tank or reservoir, and conduct the vapor from the surface of the water therein to a suitable power generator or motor, as a turbine, whose exhaust end is connected to a condenser. The hot water has a natural tendency to remain at the upper level in the tank, and by means of a circulating pump I withdraw the cooler water from the bottom of the tank and force it through the circulating system and return it, heated to a greater extent, to the tank again, there being provided automatic means for supplying to the circulating system a quantity of water corresponding to that withdrawn from the system in vapor.

In the annexed drawing I have shown, by way of example, my invention in connection with the cooling devices of a blast furnace, said devices being the source of heat for the water in the system. The water may be heated by any other cooling devices, as the coolers for open hearth furnaces, jackets of steam cylinders and of gas-engines, water of condensation in condensers, and the like.

Referring to the drawings, in which like parts are similarly designated—Figure 1 is a view, partly in section, showing my invention as applied to a blast furnace. Fig. 2 is a detail view illustrating means for automatically maintaining the volume of water in the circulating system substantially constant, and Fig. 3 is a diagram of the electric motor for operating the circulating pump, and the means to automatically control the speed of the same dependent upon the heat of the water in the circulating system. Fig. 4 is a detail plan view of the heater and its connection to the furnace.

In the specific embodiment of my invention the circulating pump 2 is driven by an electric motor 3 and discharges its water through a main 4 to a distributing pipe 5 surrounding the bosh of a blast furnace, from which small distributer pipes 6 lead to the bosh cooling plates 7 of the furnace These plates may be of any well known construction, and form no part of the present invention. The water after passing through these plates passes through small pipes 8 to a collector pipe 9, located above the pipe 5, and thence it is forced through pipes 10 and 11 into the upper part of the tank 12. The lower portion of the tank 12 is connected by pipe 13 to the suction or feed end of the pump 2.

From the upper end of the tank 12, above the level of the water therein, there extends a pipe 14 to conduct the vapor to the inlet side of a turbine 15 whose exhaust is connected by pipe 16 to a Weiss condenser 17—18, the specific structure of which forms no part of the present invention. The condenser discharges into a hot well 19 having an overflow 20 to a sewer or the like.

Connected near the bottom of tank 12 is a stand-pipe 21 containing a float 22, Fig. 2 that is capable of rising and falling with the level of the water in the tank. This float 22 is connected by links 23 and 24 to one end of a lever 25 which is pivoted at 26 in a bracket 27 secured to the stand pipe, or it may be to the tank itself. The other end of lever 25 is pivotally connected to the upper end of a rod 28 whose lower end is pivoted to a lever 29 of a butter-fly or equivalent valve 30 in a pipe 31 leading to the suction side of the pump 2 and having its intake below the normal water level of the hot well 19.

The speed of circulation, and consequently the temperature of the water at the coolers 7, (for which a safe working temperature will be in the neighborhood of 212° F.,) is controlled automatically by the controller mechanism shown in Fig. 3.

The motor I have found to be most economical in practice is a direct-current, shunt-wound motor, 3, having an adjustable starting resistance 32; and the shunt field 3ª is provided with an adjustable resistance 33 and other suitable resistances 34—41, all in series. In parallel with the resistances 34—41 is a wire 42 having as many gaps 43—50 as there are resistances 34—41. The resistances 34—41 are connected by wires 51—58 to the line 42 between the gaps 43—50. Wire 42 is electrically connected to a movable indicator hand 59 of a thermostat which is capable of being moved over a number of contacts, numbered 1—8, (as many as there are resistances.) Each contact, 1—8, is connected by wires 60—67 to as many solenoids, 68—75 connected in series, and the entire series connected to line by wire 75ª. Each solenoid has a movable core, 76—83, which carries at its end a connector, 84—91, capable of bridging its pertaining gap 43—50 when the solenoid is energized.

The index hand 59 is provided with a pinion 92 operated by a sector 93 that is pivotally connected to a Bourdon or similar tube 94 connected by a flexible tube 95 to a thermometer bulb 96 placed in the circulating system at a suitable point. The bulb of the thermometer is here shown as mounted within the pipe union 97.

The operation will be as follows: Supposing the system to start cold with the motor 3 in operation and running at its slowest speed; the index hand rests on contact No. 1, thereby causing the current to pass through the motor wire 42 and all of the magnet coils 68—75 in series, causing the coils to be energized and lift their respective connectors 84—91 to bridge all the openings 43—50 in wire 42, thereby short-circuiting all of the resistances 34—41 and placing the minimum amount of resistance at 33 in the shunt field coils 3ª. As the temperature of the water in the circulating system increases, 59 will be moved to the next contact block No. 2, which will leave magnet 68 deënergized, opening the bridge at 50 by allowing connector 84 to drop, thereby placing resistance 41 in series with the field coils 3ª of the motor. The movement of the index hand 59 over the contacts will be due to the expansion of the liquid, (mercury or equivalent substance,) in the thermometer bulb 96 and tubes 95 and 94. This operation of the hand 59 will increase the speed of the motor and consequently of the pump, thereby increasing the quantity of water circulated in a given time. The increased speed of circulation will tend to reduce the temperature of the water. In case the temperature has not been sufficiently decreased, the hand 59 is moved to contact No. 3 to cut in resistance 40, increasing the speed of the motor still more, and the hand will continue to move over the contacts until a motor speed is reached at which the water will circulate sufficiently fast to not undergo any further increase in temperature. In case of a decrease of temperature the hand 59 will be reversely moved, and automatically energizes one or more magnets to decrease the speed of the motor. Vapor from the hot water in tank 12 is drawn through turbine 15 by the condenser 17—18, thereby generating power, and when float 22 drops it opens valve 30 to permit water from the hot well 19 to enter the circulating pump and system to reëstablish the normal quantity of water in the system, a certain quantity of heat being returned into the system thereby.

In case it is found desirable to heat the water to a higher temperature than can be done by the heat derived from the cooler plates, I provide a valve 98 and one 99, capable of closing each end of pipe 10, and cause the water from the cooler plates of the furnace or other devices to pass through valve 104 in a pipe 100 to a tubular water heater 101, and thence by pipe 102 to pipe 11 and tank 12. The tubular water heater 101 is of any well known construction and is placed in the path of the gases issuing from the furnace, and in the example illustrated, is connected to the side of the down-comer 103 with a gas valve 105 between them. The top of the heater is connected by gas pipe 106 through a second gas valve 107 to the down-comer 103 and forms a by-pass for furnace gases. There is a valve 108 in water pipe 102. By this means the water may be heated to boiling point just before it is delivered to the tank, the heating of the water taking place in stages, i. e., first when the water is coldest in one heating device and then heated to a still higher temperature in the subsequent heating device. To this end gas valves 105 and 107 are opened as well as the water valves 104 and 108 while the water valves 98 and 99 are closed.

I claim—

1. In a system for utilizing the vapor of hot liquids, a storage reservoir, means to deliver the heated liquid at about the surface of the liquid in the reservoir, a turbine, a condenser connected to the exhaust end of the turbine, and means to withdraw vapor from the surface of the liquid in the reservoir through the power generator.

2. In a system for utilizing the vapor of hot water, a storage reservoir, means to deliver water below boiling temperature at about the surface of the water in the reservoir and to simultaneously withdraw water from the cooler portion of the body of water in the reservoir, means to heat the water withdrawn, thereby establishing a continuous circulation to and from the reservoir, a turbine and means to continuously withdraw vapor from the surface of the water in the reservoir through the turbine.

3. In a system for utilizing the vapor of hot water, a storage reservoir, a heater for the water, circulating means to withdraw water from the lower, cooler portion of the reservoir, force it through the heater and deliver the heated water at about the surface of the water in the reservoir, and means controlled by the temperature of the water to automatically control the speed of circulation.

4. In a system for utilizing the vapor of hot water, a storage reservoir, a heater for the water, circulating means to withdraw water from the lower, cooler portion of the reservoir, force it through the heater and deliver the heated water at about the level of the water in the reservoir, a turbine, means to continuously withdraw vapor from the reservoir through the turbine, and means to automatically maintain the quantity of circulating water constant.

5. In a system for utilizing the vapor of hot water, a storage reservoir, a plurality of heaters arranged in succession, circulating means to withdraw water from the lower, cooler portion of the reservoir, force it through the heaters in succession and thereby heat the water in stages and deliver the heated water at about the liquid level in the reservoir, a steam turbine and means to continuously draw vapor from the reservoir through the turbine.

6. In a system for utilizing the vapor of hot water, a storage reservoir, a heater for the water, circulating means to withdraw water from the cooler portion of the water in the reservoir, force it through the heater, and deliver it again to the reservoir at about the liquid level therein, means to automatically control the speed of circulation of the water, a power generator, means to withdraw vapor from the reservoir through the generator, and means to automatically maintain the quantity of water in the system substantially constant.

7. In a system for utilizing the vapor of hot water, a storage reservoir, an electric motor, a circulating pump driven thereby, a pipe connecting the reservoir and pump, furnace cooling devices connected to the delivery end of the pump, a pipe conduit connecting the cooling devices with the reservoir at or about the level of the water therein, a thermostatic electric motor controller to automaticallly control the speed of the motor and thereby of the pump, a hot well, a turbine, a pipe connection between the reservoir and turbine, a condenser into which the turbine exhausts, said condenser discharging into the hot well, a stand pipe connected to the reservoir, a float in the stand pipe, a water supply pipe from the hot well to the pump, a valve in said pipe and means to operatively connect the float and valve.

8. A system for utilizing the vapor of hot water, comprising a water circulating system including a circulating pump, an electric motor for driving the pump, electric circuits for the motor, a thermostat, a plurality of resistances in parallel with the fields of said motor, and electro-magnetic mechanism controlled by the thermostat to automatically include or cut out said resistances from the fields of the motor.

In testimony that I claim the foregoing as my invention, I have signed my name in presence of two subscribing witnesses.

CHARLES P. TURNER.

Witnesses:
 GEO. W. PARSONS,
 HOWARD E. GALLAHER.